Patented June 29, 1954

2,682,529

UNITED STATES PATENT OFFICE 2,682,529

EMULSION POLYMERIZATION OF VINYLIDENE COMPOUNDS IN THE PRESENCE OF HYDROPEROXIDES OF OCTAHYDROPHENANTHRENES

John E. Wicklatz and Fredrick M. Smith, Bartlesville, Okla., assignors to Phillips Petroleum Company, a corporation of Delaware No Drawing. Application December 9, 1949, Serial No. 132,197

11 Claims. (Cl. 260—84.1)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins.

With the increasing interest in low temperature emulsion polymerization, many variations in recipes and procedure have been developed in the interest of economy and efficiency in addition to the attention given to producing polymeric materials having the desired characteristics. Recipes of the redox type, that is, formulations wherein both oxidizing and reducing components are present, have been widely used. Oxidizing components frequently employed include materials of a peroxidic nature, and particularly compounds such as benzoyl peroxide and cumene hydroperoxide. Even though any peroxidic material might be expected to function in the capacity of the oxidant in a redox emulsion polymerization system, this is not necessarily the case since in some instances little, if any, polymerization occurs while in other cases with different peroxides the reaction takes place at a satisfactory rate. Some peroxides may function fairly satisfactorily at higher temperatures but are of little value when it is desired to carry out polymerizations at low temperatures, say below the freezing point of water.

We have now discovered that excellent conversion rates can be obtained in emulsion polymerization systems through the use of initiator, or catalyst, compositions comprising a hydroperoxide prepared from an octahydrophenanthrene. Not only are rapid polymerization rates obtained at low polymerization temperatures with these compositions, but with some recipes it is also possible to obtain these advantageous results without having present in the polymerization system any salt of a heavy metal, such as iron. In many instances it is quite desirable to produce a polymeric product completely free from such heavy metals, because of adverse influences of the metal on the physical and chemical properties of the rubber, but with other recipes it has not been feasible to obtain this desired result. The rapid reaction rates obtainable with the recipes of the present invention permit operation at low reaction temperatures, down to as low as −30 or −40° C., or lower.

The hydroperoxides used in the practice of this invention can be produced by simple oxidation of a corresponding octahydrophenanthrene, although other methods of producing such hydroperoxides can, of course, be used. When such a preparative procedure is followed, the octahydrophenanthrene should be either octahydrophenanthrene itself (formally named 1,2,3,4,4a,-9,10,10a-octahydrophenanthrene), benzooctahydrophenanthrene, or a derivative of either in which one to four methyl groups each replaces only one hydrogen per carbon atom in the octahydro part of the molecule, and/or one to two hydrogen atoms on the unhydrogenated aromatic part of the molecule is replaced by at least one of the substituents selected from the group consisting of methyl, ethyl, methoxy, ethoxy, hydroxy, and halogen other than iodine. Such compounds in which the substituent groups are only on the aromatic part of the molecule can be readily prepared by reacting the corresponding benzene or naphthalene compound with 4-vinyl-1-cyclohexene (the common dimer of 1,3-butadiene) under conditions similar to those suitable for reacting the aromatic compound with an olefin such as propylene or a butylene, as is more fully disclosed in the copending application of Fredrick M. Smith, Serial No. 133,945, filed December 19, 1949. Compounds with one or more methyl groups replacing a hydrogen atom in the octahydro part of the molecule can be prepared by the methods discussed by Bardhan and Sengupta, J. Chem. Soc., pages 2520–2526 (1932) and by Arbusov and Kuznetzov, Comp. Rend. Ac. Sci. USSR., vol. 39, 311–313 (1943).

Typical octahydrophenanthrenes from which suitable hydroperoxides can be prepared by simple oxidation include, in addition to the previously mentioned octahydrophenanthrene and benzooctahydrophenanthrene, the methyl-1,2,3, 4,4a,9,10,10a-octahydrophenanthrenes, with the methyl group on the 1, 2, 3, 4, 5, 6, 7, or 8 positions, corresponding di- and trimethyl compounds, corresponding benzo-compounds such as are produced by reacting naphthalene or a substituted naphthalene in one of the foregoing preparative procedures, such as 6-ethoxy-1,2,3, 4,4a,9,10,10a-octahydrophenanthrene, 6-chloro-1,2,3,4,4a,11,12,12a-octahydrochrysene etc.

An object of this invention is to polymerize unsaturated organic compounds.

Another object of this invention is to produce synthetic rubber.

A further object of this invention is to polymerize a monomeric material comprising a conjugated diene while dispersed in an aqueous medium.

Still another object of this invention is to effect rapid polymerization at low polymerization temperatures of monomeric materials dispersed in aqueous media.

Further objects and advantages of this invention will become apparent, to one skilled in the art, from the accompanying disclosure and discussion.

As mentioned, the hydroperoxides can be easily prepared from such parent compounds as discussed hereinbefore by simple oxidation. The compound to be oxidized is placed in a reactor, alone or in solution in an inert solvent, such as benzene or normal decane, etc., heated to the desired temperature, and free oxygen introduced at a controlled rate throughout a reaction period. This mixture is agitated during the reaction period, which is generally between one and ten hours. The oxidation temperature is preferably between 50 and 160° C., although in some instances it may be desirable to conduct the oxidation somewhat outside of this range. At the conclusion of the reaction the oxidized mixture may be employed in the polymerization reaction as such, that is, as a solution of the hydroperoxide composition in the resulting reaction mixture, or unreacted material and solvent may be first removed. The major active ingredient in such a composition is a monohydroperoxide, or a mixture of monohydroperoxides. The hydroperoxide group appears to result from introduction of two oxygen atoms between a carbon atom and a hydrogen atom in the octahydro part of the parent compound, particularly on the two carbon atoms which are directly connected to three other carbon atoms and on the carbon atom directly attached to the aromatic nucleus. Thus, for example, such an oxidation of octahydrophenanthrene produces a mixture of hydroperoxides having the formula $C_{14}H_{18}O_2$, probably comprising primarily 4a-hydroperoxy-1,2,3,4,4a,9,10,10a-octahydrophenanthrene and isomers with the hydroperoxy group in the 9 or 10a positions. Even though there are three carbon atoms which are particularly receptive to the introduction of a hydroperoxy group, the method of preparation just outlined appears to produce very little, if any, polyhydroperoxides. These hydroperoxide compositions not only give faster polymerization rates when used to effect emulsion polymerizations, but their use also frequently results in a more uniform reaction rate over a given reaction period than do hydroperoxides heretofore used. These advantages are particularly pronounced at polymerization temperatures below 10° C., and down to polymerization temperatures as low as −30 or −40° C., or lower.

We use the hydroperoxides discussed herein as oxidants in polymerization recipes at low polymerization temperatures, i. e. from about 10° C., or just above the freezing point of water, to well below the freezing point of water, such as −40° C. or lower. The recipe will also include a compound or composition which will act as a reductant in the presence of such hydroperoxides under the polymerization conditions set forth herein. Apparently the hydroperoxide and such a reductant slowly interreact during the course of the polymerization to produce or generate free radicals, which continually initiate chain-type polymerization reactions. In some recipes such a reductant will be a single compound, or a mixture of homologous compounds, such as hydrazine, ethylenediamine, diethylenetriamine, aminoethylethanolamine, ethylenemethylethylenetriamine, tetraethylenepentamine, and the like. These compounds have the general formula $$RHN(CHXCHXNH)_m(CHXCHX)_nNHR$$

where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water-soluble and less oil(hydrocarbon)-soluble; particularly useful non-hydrocarbon substituents include oxygen in the form of hydroxy and ether compounds, sulfur in similar compounds (i. e. mercapto compounds and thioethers) and halogen compounds. In such recipes, such a polyamino compound appears to act as a reductant, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of polyamino compound used to obtain optimum results also is dependent upon other ingredients in the recipe. Preferred results are usually obtained with between 0.02 to 5 parts by weight, per 100 parts of monomeric material, of the polyamino compound. In other recipes a composition is used which comprises one compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable organic compound having a hydroxy group on a carbon atom directly attached to an aldehyde or ketone group. Compounds frequently employed in this capacity are glucose, levulose, sorbose, invert sugar, hydroxy acetone, glyceraldehyde, and other aldoses and ketoses. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps $Na_2FeP_2O_7$. In any event the complex whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amount of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxy-styrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

It is one of the outstanding advantages of the use of the hydroperoxides, as disclosed herein, that it is feasible to produce "high solids" latices, i. e. latices resulting from the use of an amount of aqueous medium in the lower part of the range disclosed, i. e. a ratio of aqueous phase to monomeric material between 0.5:1 to 1:1 and an extent of conversion in the higher part of the range disclosed, i. e. from 70 per cent conversion to complete conversion.

Emulsifying agents which are applicable in these low temperature polymerizations are materials such as potassium laurate, potassium oleate, and the like, and salts of rosin acids. However, other emulsifying agents, such as nonionic emulsifying agents, salts or alkyl aromatic sulfonic acids, salts of alkyl sulfates, and the like which will produce favorable results under the conditions of the reaction, can also be used in practicing the invention, either alone or in admixture with soaps. The amount and kind of emulsifier used to obtain optimum results is somewhat dependent upon the relative amounts of monomeric material and aqueous phase, the reaction temperature, and the other ingredients of the polymerization mixture. Usually an amount between about 0.3 and 5 parts per 100 parts of monomeric material will be found to be sufficient.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred, except when a polyamino compound is used as a reductant, in which case a somewhat higher pH should usually be used.

In preparing synthetic rubber by polymerizing conjugated dienes by the process of the invention, it is usually desirable to use a polymerization modifying agent, as is usually true in other polymerizatons to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of hydroperoxide used to obtain an optimum reaction rate will depend upon the other reaction condition, and particularly upon the type of polymerization recipe used. The amount is generally expressed in millimols per 100 parts of monomeric material, using in each instance the same units of weight throughout, i. e. when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

Advantages of this invention are illustrated by the following examples. The reactants, and their proportions, and the other specific ingredients of the recipes are presented as being typical and should not be construed to limit the invention unduly.

*Example I*

1,2,3,4,4$a$,9,10,10$a$ - octahydrophenanthrene (100 parts) was oxidized by charging it to a reactor together with 1.3 parts of the potassium salt of triisopropylbenzene hydroperoxide, this latter compound being employed as an initiator for the reaction. The temperature was adjusted to 115° C. and dry oxygen introduced over a 1.5-hour period while the mixture was stirred. The concentration of hydroperoxide at this point was 10.8 per cent by weight. Portions of this material were used to supply the resulting monohydroperoxide, in the amounts indicated, as the oxidant in the following polymerization recipe.

| | Parts by weight |
|---|---|
| Butadiene | 72 |
| Styrene | 28 |
| Water, total | 180 |
| Rosin soap, potassium salt [1] | 4.7 |
| Mercaptan blend [2] | 0.25 |
| Hydroperoxide | 0.25 |
| Potassium hydroxide | Variable |
| Potassium chloride | 0.037 |
| Dextrose | 0.5 |
| Activator composition: | |
| $K_4P_2O_7$ | 1.0 |
| $FeSO_4 \cdot 7H_2O$ | 0.165 (0.50 millimol) |
| Water to make 25 ml. of solution. | 0.14 (0.50 millimol) |

[1] Dresinate 214; solution pH 10.
[2] A blend of tertiary $C_{12}$, $C_{14}$, and $C_{16}$ aliphatic mercaptans in a ratio of 3:1:1 parts by weight.

The activator composition was prepared by heating a mixture of the ferrous sulfate, potassium pyrophosphate, and water at 60° C. for 20 minutes.

The dextrose, potassium hydroxide, and 25 parts water were heated at 70° C. for 25 minutes and added to the soap solution. The mercaptan dissolved in the styrene was then added, the temperature adjusted to the desired level, the butadiene introduced followed by the hydroperoxide, and finally the activator composition. Polymerization was effected at 5° C. The time-conversion data are recorded below together with the amounts of hydroperoxide employed. For purposes of comparison, a control run was made using cumene hydroperoxide in an amount previously found to be optimum for the recipe.

| Hydroperoxide | | | $FeSO_4 \cdot 7H_2O$, Parts | Mols Hydroperoxide per Mol $Fe^{++}$ | Conversion, Percent | | |
|---|---|---|---|---|---|---|---|
| Type | Parts | Millimols | | | 2 Hrs. | 5 Hrs. | 7 Hrs. |
| 1,2,3,4,4$a$,9,10,10$a$-octahydrophenanthrene | 0.082 | 0.375 | 0.14 | 0.75 | 26.6 | 65.0 | 86.0 |
| Do | 0.109 | 0.5 | 0.14 | 1.0 | 23.2 | 66.6 | 88.3 |
| Do | 0.163 | 0.75 | 0.14 | 1.5 | 21.4 | 61.4 | 81.8 |
| Do | 0.218 | 1.0 | 0.14 | 2.0 | 18.4 | 53.4 | 78.4 |
| Cumene | 0.1 | 0.66 | 0.14 | 1.3 | 11.0 | 26.0 | 40.2 |

*Example II*

The hydroperoxide from 1,2,3,4,4$a$,9,10,10$a$-octahydrophenanthrene was prepared as in Example I and used as an oxidant in the following 5° C. polymerization recipe:

| | Parts by weight |
|---|---|
| Butadiene | 70 |
| Styrene | 30 |
| Water | 180 |
| Fatty acid soap [1] | 5 |
| Mercaptan blend [2] | 0.1 |
| Tetraethylenepentamine | 0.756 (4.0 millimols) |
| Hydroperoxide | 0.436 (2.0 millimols) |
| Potassium chloride | 0.4 |

[1] Potassium Office Rubber Reserve soap.
[2] As in Example I.

A mixture of the emulsifying agent, water, and potassium chloride was prepared and potassium hydroxide added to adjust the pH to 11.0. A solution of the hydroperoxide and mercaptan in styrene was then introduced followed by the butadiene. The reactor was pressured to 30 pounds per square inch gauge with nitrogen and the temperature adjusted to 5° C. Sufficient water was added to the tetraethylenepentamine to make a solution and this mixture was then charged to the reactor. Polymerization was effected in the conventional manner while the temperature was held at 5° C. The following time-conversion data were obtained:

| Time, hours | Conversion, per cent |
|---|---|
| 2 | 52 |
| 3 | 67 |
| 6 | 93 |

*Example III*

Alpha chloronaphthalene is reacted with vinylcyclohexene and a chlorobenzooctahydrophenanthrene fraction obtained from the reaction mixture. This material is converted to a hydroperoxide by dissolving 100 parts in 700 parts of naphthalene and passing oxygen gas through the solution at 120° C. for three hours, in the presence of 1 per cent of a potassium salt of triisopropylbenzene hydroperoxide. The hydroperoxide is recovered by converting it to the potassium salt, which is separated, and then regenerating the hydroperoxide and dissolving it in toluene to form a 10 per cent solution. This solution of hydroperoxide is used in the recipe of Example I, with 0.375 millimol of the hydroperoxide, with about 80 per cent conversion of the monomeric material in 6 hours.

*Example IV*

A portion of the hydroperoxide of octahydrophenanthrene, prepared as in the first part of Example I, is used at 5° C. in the following polymerization recipe:

| | Parts by weight |
|---|---|
| Butadiene | 70 |
| Styrene | 30 |
| Water | 180 |
| Potassium rosin soap [1] | 5 |
| $Na_3PO_4.12H_2O$ | 0.3 |
| Mercaptan blend [2] | 0.25 |
| Hydroperoxide | 0.26 (1.25 millimols) |
| $Na_2S_2O_4.2H_2O$ | 0.21 (1.0 millimols) |

[1] Dresinate 214, pH 11.4.
[2] See Example I.

The sodium hyposulfite (both reductant and activator) was dissolved in part of the water, and this solution was mixed in the reactor with a solution of the soap and pyrophosphate in the rest of the water. Thereafter there was added the styrene, containing the mercaptan in solution, the butadiene, and then the hydroperoxide. Polymerization started promptly, with 15 per cent conversion in 11 hours, 27 per cent in 19 hours, and 42 per cent in 40.3 hours. Using the same recipe, but with an equimolecular amount of cumene hydroperoxide, the conversion was only 36 per cent in 40.3 hours.

*Example V*

Polymerization was effected at −10° C. using the following recipe:

| | Parts by weight |
|---|---|
| Butadiene | 70 |
| Styrene | 30 |
| Water, total | 180 |
| Methanol | 45 |
| Rosin soap, K salt [1] | 3.5 |
| Fatty acid soap, K salt [2] | 1.5 |
| Mercaptan blend [3] | 0.25 |
| 1,2,3,4,4a,9,10,10a - octahydrophenanthrene hydroperoxide | 0.109 (0.5 millimol) |
| Tetraethylenepentamine | 0.19 (1.0 millimol) |
| Tripotassium phosphate, $K_3PO_4$ | 0.50 |

[1] Dresinate 214: solution pH 12.2.
[2] Potassium Office Rubber Reserve soap.
[3] See Example I.

The emulsifiers were dissolved in the methanol and to this mixture the water and potassium phosphate were added and the pH adjusted to 12.2 by the addition of potassium hydroxide. A mixture of the styrene, mercaptan, and hydroperoxide was layered on the emulsifier solution and stored over night at 0° C. Butadiene was then introduced, the temperature adjusted to −10° C., and the reactor pressured to 30 pounds per square inch gauge with nitrogen after which the tetraethylenepentamine dissolved in 10 parts water was added. A parallel run was made using an equivalent amount (0.076 part, 0.5 millimol) of cumene hydroperoxide, and another using tetralin hydroperoxide (0.082 part, 0.5 millimol). The results are recorded below.

| Hydroperoxide of— | Conversion, Percent | | |
|---|---|---|---|
| | 4 Hours | 6.5 Hours | 24 Hours |
| 1,2,3,4,4a,9,10,10a-octahydrophenanthrene | 25 | 37 | 83 |
| Cumene | 6 | 12 | 45 |
| 1,2,3,4-tetrahydronaphthalene | 3 | 4 | 8 |

*Example VI*

A series of polymerizations at −10° C. was run at variable pH levels using 1,2,3,4,4a,9,10,10a-octahydrophenanthrene hydroperoxide as the oxidant. The following recipe was employed:

| | Parts by weight |
|---|---|
| Butadiene | 70 |
| Styrene | 30 |
| Water, total | 192 |
| Methanol | 48 |
| Rosin soap, K salt [1] | 3.5 |
| Fatty acid soap, K salt [1] | 1.5 |
| Mercaptan blend [1] | 0.25 |
| 1,2,3,4,4a,9,10,10a - octahydrophenanthrene hydroperoxide | 0.109 (0.5 millimol) |
| Tetraethylenepentamine | 0.19 (1.0 millimol) |
| Potassium chloride | 0.25 |

[1] As in Example V.

The following results were obtained:

| pH of Emulsifier Solution | Conversion, Percent | | |
|---|---|---|---|
| | 4 Hours | 7 Hours | 24 Hours |
| 10.4 | 24 | 42 | 75 |
| 11.05 | 31 | 52 | 89 |
| 11.4 | 33 | 52 | 93 |
| 11.9 | 15 | 23 | 71 |

*Example VII*

1,2,3,4,4a,9,10,10a-octahydrophenanthrene hydroperoxide was used as the oxidant in the following 5° C. polymerization recipe:

| | Parts by weight |
|---|---|
| Butadiene | 70 |
| Styrene | 30 |
| Water | 180 |
| Rosin soap, K salt [1] | 5 |
| Mercaptan blend [1] | 0.25 |
| Trisodium phosphate, $Na_3PO_4.12H_2O$ | 0.05 |
| 1,2,3,4,4a,9,10,10a - octahydrophenanthrene hydroperoxide | 0.327 (1.5 millimols) |
| Sodium hyposulfite $Na_2S_2O_4$ | 0.174 (1.0 millimol) |

[1] As in Example V.

A 14 per cent conversion was obtained in 15 hours.

As will be evident to those skilled in the art, various modifications of this invention can be made, or followed, in the light of the foregoing disclosure and discussion, without departing from the spirit or scope of the disclosure or from the scope of the claims.

We claim:
1. An improved process for the production of synthetic rubber, which comprises establishing and maintaining at a polymerization temperature between 10 and −40° C. an emulsion of an aqueous phase having a pH between 9 and 12, a liquid monomeric material comprising a major amount of 1,3-butadiene and a minor amount of styrene, an emulsifying agent, a polymerization modifier, and a polymerization catalyst composition comprising 0.1 to 10 millimols, per 100 parts by weight of said monomeric material, of a hydroperoxide having the formula $C_{14}H_{18}O_2$ and having the same carbon atom structure as 1,2,3,4,4a,9,10,10a-octahydrophenanthrene, together with 0.1 to 3 millimols of an alkali metal ferrous pyrophosphate complex.

2. In the production of synthetic rubber by the polymerization of a monomeric material comprising a major portion of 1,3-butadiene and a minor portion of styrene while dispersed in an aqeuous medium in the presence of a catalyst composition at a polymerization temperature, the improvement which comprises polymerizing said monomeric material at a polymerization temperature between 10 and −40° C. with the pH of said aqueous medium between 9 and 12 in the presence of a catalyst composition comprising 0.1 to 10 millimols of a hydroperoxide of 1,2,3,4,4a,9,10,10a-octahydrophenanthrene, together with 0.02 to 5 parts of tetraethylenepentamine, said amounts being per 100 parts by weight of said monomeric material.

3. In the production of synthetic rubber by the polymerization of a monomeric material comprising a major portion of 1,3-butadiene and a minor portion of styrene while dispersed in an aqueous medium in the presence of a catalyst composition comprising an oxidant and a reductant at a polymerization temperature, the improvement which comprises polymerizing said monomeric material at a polymerization temperature between 10 and −40° C. with the pH of said aqueous medium between 9 and 12 in the presence of a catalyst composition comprising as said oxidant 0.1 to 10 millimols of a hydroperoxide of 1,2,3,4,4a,9,10,10a - octahydrophenanthrene, per 100 parts by weight of said monomeric material.

4. In the production of synthetic rubber by polymerization of a monomeric material comprising a conjugated diene while dispersed in an aqueous medium in the presence of an oxidant and a reductant, the improvement which comprises polymerizing said monomeric material in the presence of 0.1 to 10 millimols of a hydroperoxide of 1,2,3,4,4a,9,10,10a-octahydrophenanthrene and 0.02 to 5 parts of tetraethylenepentamine, said amounts being per 100 parts by weight of said monomeric material.

5. In the production of synthetic rubber by polymerization of a monomeric material comprising a conjugated diene while dispersed in an aqueous medium in the presence of an oxidant and a reductant, the improvement which comprises polymerizing said monomeric material in the presence of a polymerization catalyst comprising as said oxidant a hydroperoxide of 1,2,3,-4,4a,9,10,10a-octahydrophenanthrene.

6. In the production of synthetic rubber by polymerization of a monomeric material comprising a conjugated diene while dispersed in an aqueous medium in the presence of an oxidant and a reductant, the improvement which comprises polymerizing said monomeric material in the presence of a polymerization catalyst comprising as said oxidant a hydroperoxide of an octahydrophenanthrene selected from the class consisting of octahydrophenanthrene and benzooctahydrophenanthrene, and derivatives of each in which substituents on the octahydro part of the molecule consist of not more than four methyl groups each replacing one hydrogen per carbon atom, and substituents on the unhydrogenated aromatic part of the molecule consist of methyl, ethyl, methoxy, ethoxy, hydroxy, fluorine, chlorine, and bromine groups wherein not more than two of said groups replace hydrogen atoms on said unhydrogenated aromatic part of the molecule.

7. An improved process for producing a polymeric material of high molecular weight, which comprises establishing and maintaining at a polymerization temperature a dispersion of an aqueous phase, a liquid monomeric material comprising an unsaturated organic compound having an active $CH_2=C<$ group and polymerizable while in an aqueous dispersion, an emulsifying agent, and a polymerization catalyst composition comprising an oxidant and a reductant in which said oxidant is a hydroperoxide of an octahydrophenanthrene selected from the class consisting of octahydrophenanthrene and benzooctahydrophenanthrene, and derivatives of each in which substituents on the octahydro part of the molecule consist of not more than four methyl groups each replacing one hydrogen per carbon atom, and substituents on the unhydrogenated aromatic part of the molecule consist of methyl, ethyl, methoxy, ethoxy, hydroxy, fluorine, chlorine, and bromine groups wherein not more than two of said groups replace hydrogen atoms on said unhydrogenated aromatic part of the molecule.

8. The process of claim 7, in which said hydroperoxide is a hydroperoxide of a benzooctahydrophenanthrene.

9. An improved process for producing synthetic rubber, which comprises establishing and maintaining at a polymerization temperature not higher than 10° C. a dispersion of an aqueous phase, a liquid monomeric material comprising a conjugated diene having not more than six carbon atoms per molecule, an emulsifying agent, and a catalyst composition comprising an oxidant and a reductant in which said oxidant is a hydroperoxide having the formula $C_{14}H_{18}O_2$ and having the same carbon atom structure as 1,2,3,4,4a,9,10,10a-octahydrophenanthrene.

10. The process of claim 9 in which said reductant comprises a pyrophosphate complex of an alkali metal and a multivalent metal capable of existing in aqueous solution in each of two valence states.

11. An improved process for producing a polymeric material of high molecular weight, which comprises establishing and maintaining at a polymerization temperature a dispersion of an aqueous phase, a liquid monomeric material comprising an unsaturated organic compound having an active $CH_2=C<$ group and polymerizable while in an aqueous dispersion, an emulsifying agent, and a polymerizzation catalyst composition comprising an oxidant and a reductant in which said oxidant is a hydroperoxide of 1,2,3,-4,4a,9,10,10a-octahydrophenanthrene.

No references cited.